Sept. 7, 1965
H. D. CANAZZI
3,204,618
MEANS FOR IMPROVING THE EFFICIENCY OF SUPERCHARGED TWO-CYCLE ENGINES
Filed Oct. 30, 1961
2 Sheets-Sheet 1
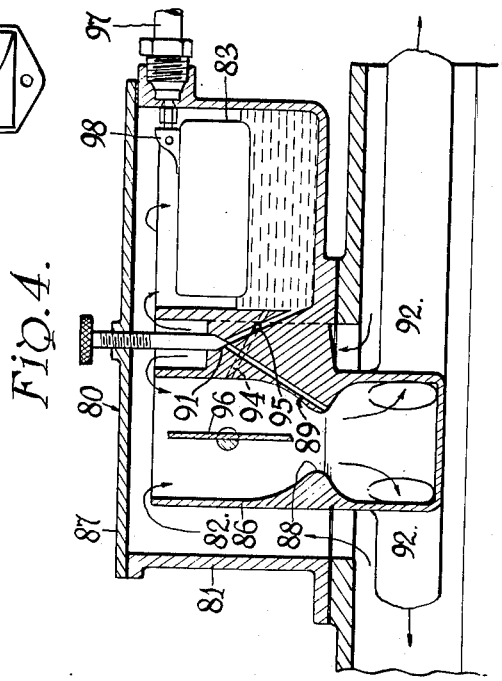
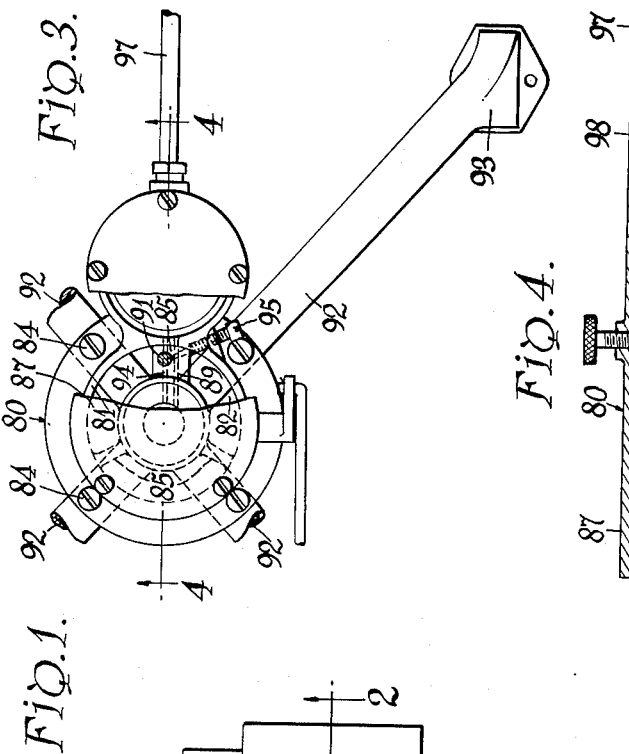
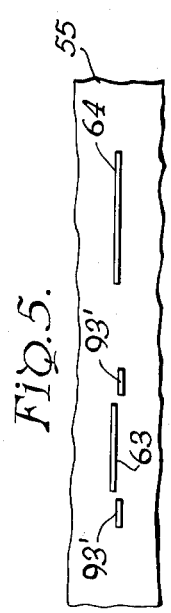
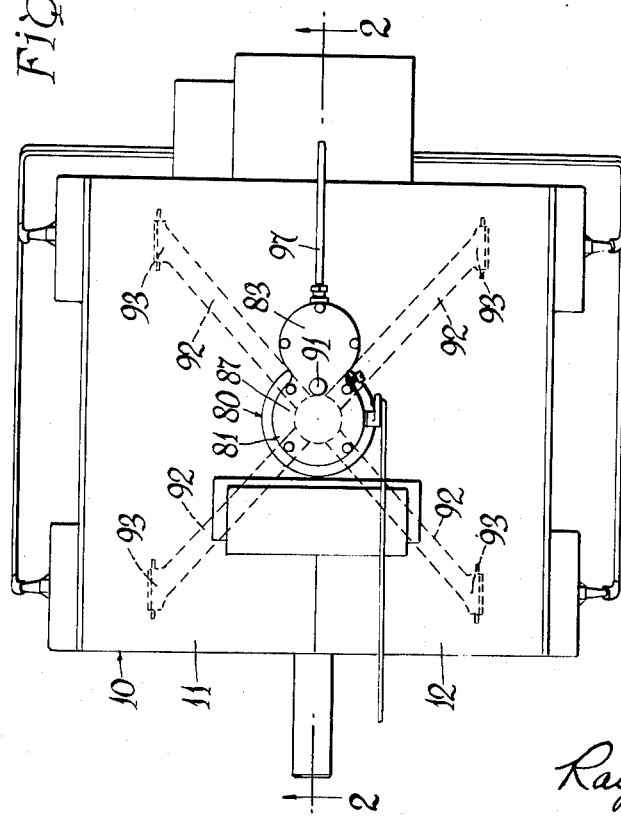
INVENTOR.
Henry Donald Canazzi,
BY
Raymon E. Rousseau.
ATTORNEY

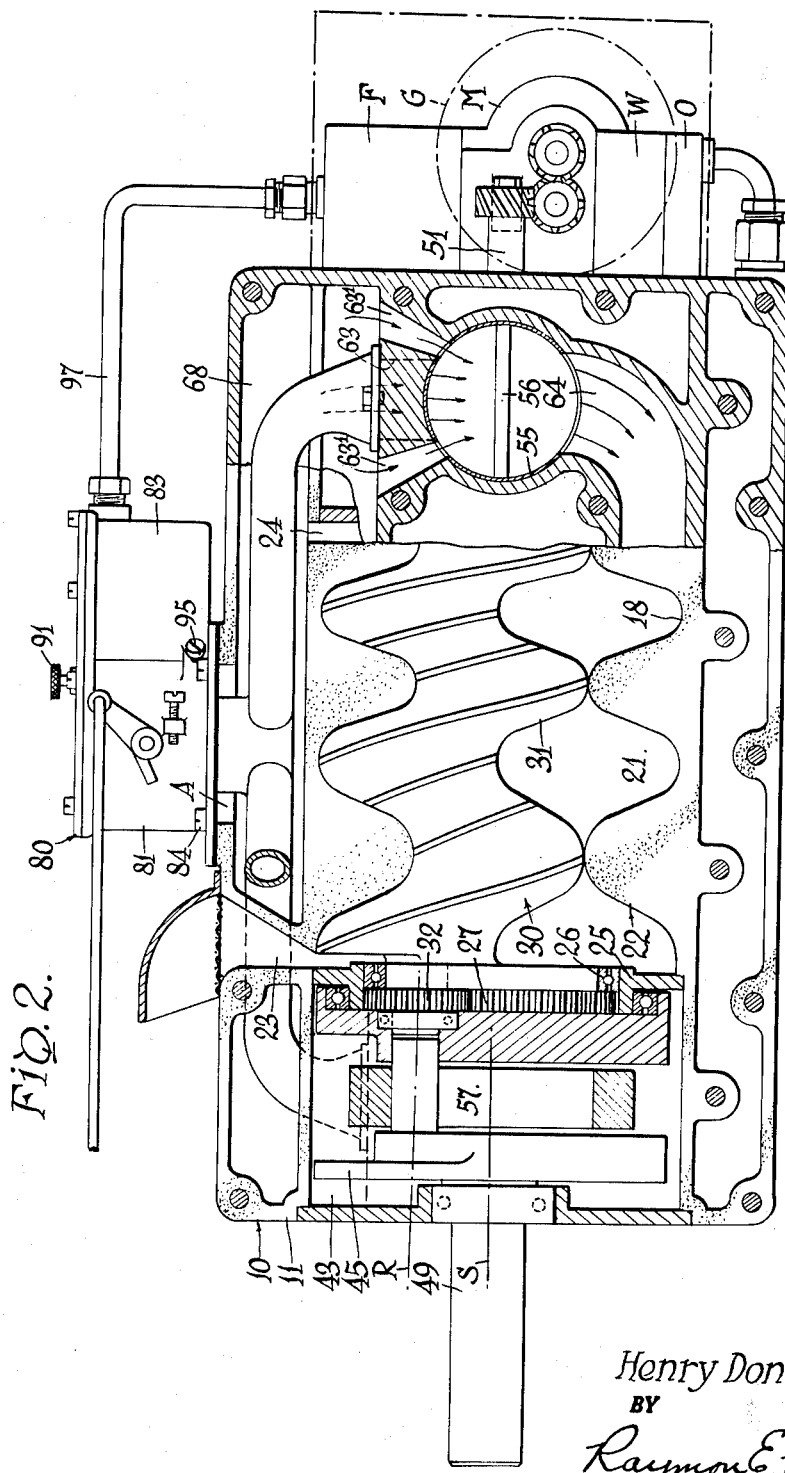

United States Patent Office 3,204,618
Patented Sept. 7, 1965

3,204,618
MEANS FOR IMPROVING THE EFFICIENCY OF SUPERCHARGED TWO-CYCLE ENGINES
Henry Donald Canazzi, 178 Jewett Parkway, Buffalo, N.Y.
Filed Oct. 30, 1961, Ser. No. 148,439
6 Claims. (Cl. 123—65)

My invention relates to engines and more particularly to improvements in two-cycle supercharged engines of the type shown in my Patent 2,874,534.

In this patent a small fuel line extends into a supercharged air plenum and is provided with small orifices through which predetermined quantities of fuel are ejected at predetermined intervals by an injector mechanism directly into the intake port of each cylinder for mixture with supercharged air entering the cylinder through said intake port. However, it has been found that such a fuel injection system is expensive, that driving the fuel injector mechanism requires the use of an appreciable amount of the engine's power, that, due to the resistance to the injection of fuel through the small fuel line, it is difficult to attain and maintain a proper mixture of the fuel with supercharged air and, that since the supercharged air-fuel mixture was used to scavenge the products of combustion from the cylinders having the usual arrangement of their intake and exhaust ports an appreciable volume of such mixture was lost.

Accordingly, an object of my present invention is to overcome the above stated objections to the two-cycle supercharged engine disclosed in my prior Patent 2,874,534.

Another object is to provide a more efficient and less expensive means for mixing fuel with supercharged air and directly conducting said mixture to the intake port of such an engine.

Another object is to provide such an engine with sealed fuel and air mixing means in communication with each other and in open communication with the source of supercharged air and operable solely by the flow of supercharged air therethrough.

Another object is to provide the sealed fuel and air mixing means with means for controlling the rate of flow of fuel and supercharged air therethrough.

Another object is to provide said fuel and air mixing means with conduit means for directly conducting the mixture to the intake port of such an engine.

Another object is to provide such an engine with a scavenging port formed and located between the cylinder and the source of supercharged air to be opened by the intake movement of the engine piston prior to the opening of the intake port, whereby supercharged air flows through said scavenging port to force the products of combustion in the cylinder toward and through its exhaust port prior to admission of the fuel-supercharged mixture into the engine cylinder.

The foregoing objects and other objects, advantages and characteristics of my present invention will appear from a perusal of the following detailed description and the drawings of a presently preferred form thereof wherein like reference characters denote like parts in the several views; and wherein:

FIGURE 1 is a top plan view of a two-cycle supercharged engine constructed in accordance with the principles of my present invention and provided with an improved means for directly mixing fuel with supercharged air and conducting said mixture to its intake port.

FIGURE 2 is an enlarged vertical sectional view taken about on the line 2—2 of FIGURE 1 with certain parts shown in elevation for ease of illustration.

FIGURE 3 is an enlarged fragmentary top plan view of the fuel-air mixing and distributing means shown in FIGURES 1 and 3 with cover parts thereof broken away to better illustrate its construction.

FIGURE 4 is an enlarged vertical fragmentary sectional view of said mixing and distributing means taken about on the line 4—4 of FIGURE 3, and FIGURE 5 is a developed view showing the arrangement of the inlet and outlet ports.

The general construction of a presently preferred form of the supercharged two-cycle engine of the present invention is essentially the same as that shown in my Patent 2,874,534 and need not be described in full detail other than to say that the engine body 10 is formed of the complementary right-hand and left-hand castings 11 and 12 each formed with central semi-circular recesses 18 which when the castings are alined and secured together are locatable to provide a central tubular stator chamber 21 provided with an internal double pitch thread 22 having a varying pitch angle which gradually decreases from an air inlet conduit 23 to an air outlet opening 24. A removable closure plate 25 closes each end of the chamber 21 which, except for its inlet conduit 23 and its outlet conduit 24 is completely sealed. The plates 25 each carry a bearing 26 for rotatably mounting the ends of a rotor 30, in concentric relation to the stator chamber 21. The body of the rotor 30, as in Patent 2,874,534, is excentrically located and formed with a varying pitch helical screw body portion 31 which interengages the thread 22 of the stator chamber 21 and which because the ends of the rotor 30 each carry a gear 32 half the diameter of and meshed with a ring gear 27 carried by each of the plates 25, makes two revolutions about an axis R for each revolution about an axis S thereby substantially doubling the volume of air compressed by the supercharger 30, and forced into a surge tank or plenum chamber 68. Obviously if it is desired to have the rotor make only one revolution about the axis R for each revolution about the axis S, the gears 27 and 32 would be eliminated and the size of the supercharger increased to provide the desired volume of supercharged air.

As in my prior Patent 2,874,534, each end of the present engine 10 includes a crank case chamber 43 for a drive mechanism 45 and the cylinders 55, in which the pistons 56 are slidably mounted and connected by connecting rods 57 to drive the mechanisms 45 and an output shaft 49, are provided with suitable intake and exhaust ports 63 and 64. This engine also includes an accessory drive shaft 51 which as schematically indicated at the right side of FIGURE 2 drives any suitable type of a starter-generator G, a fuel pump F, a magneto M, a water pump W, and an oil pump O.

In said prior patent a predetermined quantity of the fuel was forced by an injector mechanism through small diameter fuel tubes and ejected from tiny holes therein into the intake port to form therein a combustible mixture of said fuel with supercharged air flowing through said port and into the cylinder. However, it was found that such an arrangement was costly and rather inefficient in that driving the injector used some of the engine's power and in that, due to the line friction of the small fuel tubes and their outlet holes, it was difficult to accurately control the quantity of fuel ejected and difficult to attain and maintain a proper mixture of the fuel with the supercharged air. It was also found that since the supercharged mixture alone was used to scavenge the cylinder by forcing the products of combustion therefrom and into the exhaust port some of the unburned mixture was lost.

Accordingly, to overcome the deficiencies of my prior engine and to attain the objects of my present invention, each cylinder 55 to promote better scavenging of the products of combustion therefrom, is provided with one or more scavenging air intake ports 63', which, as best seen in FIGURE 5, are preferably located at the opposite sides and slightly forward of the air intake port 63. The ports 63' directly communicate with the supercharged air plenum chamber 68 as shown in FIGURE 2, so that upon being uncovered during the intake stroke of the associated piston 56, small jets of supercharged air burst into the cylinder 55 and first act to force the products of combustion in the cylinder toward its exhaust port 64 and simultaneously with the opening of the ports 63' or shortly thereafter the exhaust port 64 is opened to allow the supercharged air jets to force the products of combustion therethrough, then the intake port 63 is opened to allow a supercharged mixture of fuel and air to enter the cylinder. Then the several ports are closed. The interval of time between the sequential opening and closing of the ports is very short, however, it is sufficient to allow proper scavenging of the products of combustion from the cylinder and to allow a fresh supercharged mixture of fuel and air to flow into the cylinder and to be agitated and thoroughly mixed by supercharged air flowing through the ports 63' before its exhaust port 64 closes. The location, extent and area of the exhaust ports 64 with respect to the location, extent and area of the ports 63 and 63' is such that it closes before any appreciable amount of the fuel-air mixture can be forced therethrough and lost.

The sides of the ports 63 and 63' are inwardly inclined toward each other thereby to accelerate the flow therethrough and the ports 63' are angularly related to the port 63 thereby to cause the incoming supercharged air to better scavenge burnt gases from the cylinder and to better agitate and mix with the incoming fuel-air mixture.

By reason of the above described arrangement, form and relation of the ports 63, 63' and 64 little if any of the fuel-air mixture is lost during the combined intake-exhaust stroke of the engine and for this reason it should be apparent that the volume of fuel required to operate this engine under given conditions will be less than that required to operate my prior and other prior two-cycle engines.

An important feature of my present invention resides in providing such an engine with a carburetor-like fuel and supercharged air mixing means generally indicated by the numeral 80 and best seen in FIGURES 3 and 4. The means 80 is operable solely by the flow of supercharged air therethrough and comprises a body 81 formed with an upright tubular fuel and air mixing chamber 82 and an adjacent fuel reservoir chamber 83.

The chamber 82 has its open flanged bottom end in communication with an opening or aperture A in the top wall of the supercharged air plenum chamber 68 and being secured thereto by screws 84 is provided with radially disposed legs 85 which carry a venturi tube 86 in concentric relation to the chamber 82. The top edge of the reservoir chamber 83 and the tube 86 terminate below the top edge of the chamber 82, which is sealingly closed by a cap 87, so that supercharged air from the plenum 68 flows through said chamber and tube, as indicated by the arrows in FIGURE 4, and in flowing over a reduced venturi-shaped throat portion 88 formed in the tube 86, and the inner end of a angular bore 89, extending through one of the legs 85 and establishing communication between the bottom of the fuel reservoir 83 and the throat portion 88, induces a predetermined flow of fuel through the bore 89 and its mixture with the supercharged air flowing through the venturi tube 86. This flow of fuel is regulatable by the tapered end of a needle valve 91 which intersects the bore 89 and is adjustably carried by the cap 87 to provide a desired flow of the fuel and a suitable mixture of the fuel with the supercharged air. This fuel-air mixture, as indicated by the arrows in FIGURE 4, flows to the closed bottom end of the venturi tube 86 and into the open end and through conduit tubes 92 which each have their opposite end 93 sealingly secured to and in open communication with the intake port 63 of one of the cylinders.

As best seen in FIGURES 3 and 4, another small bore 94 extends through the leg 85 and between the reservoir 83 and the throat 88 of the tube 86. Flow of fuel through the bore 94 is regulatable by the tapered end of a needle valve 95 which is arranged and adjustable to provide a desired idling mixture of fuel and air for the engine, and as best seen in FIGURE 4 the venturi tube 86 is provided with a throttle valve 96 for controlling the speed of the engine.

Referring to FIGURE 2 it will be seen that the fuel pump F is connected by a fuel feed pipe 97 to the reservoir 83 and pumps fuel thereinto to a level determined by a conventional valve and float means 98.

From the foregoing description it should now be clear that since my fuel-supercharged-air mixing and distributing means is operable solely by the flow of supercharged air therethrough no power of the engine is lost, and that since a blast of supercharged air is admitted to each cylinder by its piston uncovering its scavenging ports 63' prior to and during the admission of the supercharged air-fuel mixture thereinto, the blasts of supercharged air act to more completely scavenge burnt gases from the cylinder and thereafter act to agitate and to more thoroughly mix with the incoming charge of the supercharged fuel-air mixture to provide an ideal combustible mixture. Accordingly, any two-cycle supercharged engine provided with my improved features is more efficient than prior two-cycle supercharged engines in that none of its power and little or none of its fuel mixture is lost by and during its operation.

It should be understood that the herein shown and described form of my present invention is intended to exemplify its principles and that various modifications and rearrangements of its porting and carburetor means may be made within the scope of the appended claims.

I claim:

1. In a two-cycle supercharged engine having intake ports and an exhaust port in its cylinder wall, a source of supercharged air, one of said intake ports being in direct communication with said source of supercharged air and having its forward wall substantially alined with the forward wall of the exhaust part and slightly forward of the other intake port, whereby during the intake-exhaust stroke of the engine said one intake port and said exhaust port open substantially simultanously and prior to the opening of the other intake port, thereby admitting supercharged air into the cylinder for forcing exhaust gases therein toward and through the exhaust port.

2. A two-cycle supercharged engine as set forth in claim 1 wherein the other inlet port is in independent communication with a sealed fuel-supercharged air mixing means in communication with the source of supercharged air and is opened by and during said engine stroke while the one port is partially open whereby a fuel-supercharged air mixture is independently admitted through said other port and into the cylinder and is agitated therein by supercharged air being forced through the one port into the cylinder.

3. A two-cycle supercharged engine as set forth in claim 2 wherein the walls of the intake ports are each inwardly tapered to accelerate the flow of supercharged air through the one port into the cylinder and the flow of the fuel-supercharged air mixture through the other port into the cylinder.

4. A two-cycle supercharged engine as set forth in claim 3 wherein the intake ports are angularly related one to the other to cause a better and more complete mixing in the cylinder of the supercharged air with the fuel-supercharged air mixture, and said intake ports are directed toward said exhaust port.

5. A two-cycle supercharged engine as set forth in claim 2 in which said cylinder is provided with two circumferentially spaced inlet ports in direct communication with said source of supercharged air.

6. A two-cycle supercharged engine as set forth in claim 2 which comprises a plurality of cylinders each having one inlet port communicating directly with said source of supercharged air and another inlet port communicating directly with said fuel-supercharged air mixing means.

References Cited by the Examiner

UNITED STATES PATENTS

| 1,250,715 | 12/17 | Toomey | 123—65 |
| 1,342,483 | 6/20 | Wickwire | 123—69 |
| 1,649,554 | 11/27 | Sweet | 123—69 |
| 2,006,656 | 7/35 | Sherman | 123—65 |
| 2,075,232 | 3/37 | Schneider | 123—65 |
| 2,381,832 | 8/45 | Mansoff | 123—69 |
| 2,635,593 | 4/53 | Stoll | 123—65 |

FOREIGN PATENTS 855,637 11/52 Germany.

FRED E. ENGELTHALER, *Primary Examiner.*

SAMUEL LEVINE, *Examiner.*